Dec. 24, 1968  I. SCHWEBEL  3,417,713
FORMING DEVICE FOR BUN MAKING MACHINE
Filed March 3, 1967
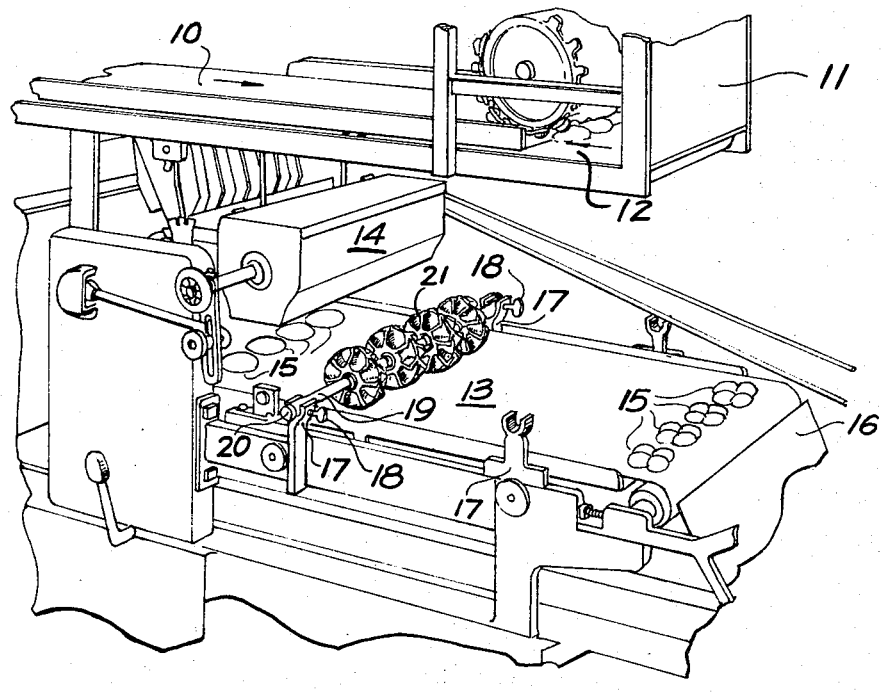
FIG_1
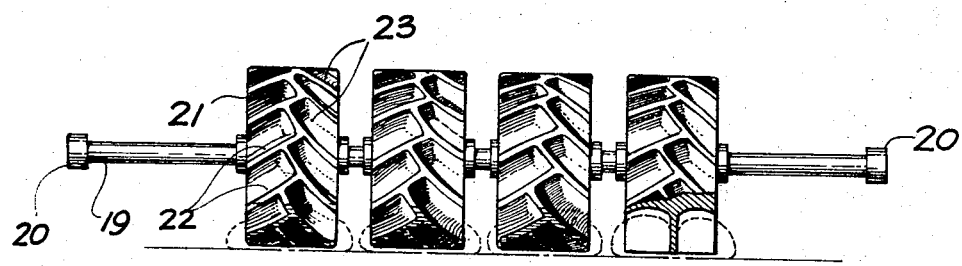
FIG_2
INVENTOR.
Irving Schwebel
BY
W. B. Hartman
ATTORNEY.

United States Patent Office 3,417,713
Patented Dec. 24, 1968

3,417,713
FORMING DEVICE FOR BUN MAKING MACHINE
Irving Schwebel, Youngstown, Ohio, assignor to Lake Park Machinery, Inc., Youngstown, Ohio, a corporation of Ohio
Filed Mar. 3, 1967, Ser. No. 620,358
4 Claims. (Cl. 107—4)

ABSTRACT OF THE DISCLOSURE

A device attachable to a bun forming machine providing a plurality of rotary dough embossing members acting to engage pieces of shaped dough formed by said machine to substantially separate said pieces of dough into a plurality of sections whereby buns baked from said shaped pieces of dough have the characteristics of buns formed from a group of individual pieces of dough.

---

This invention relates to a forming device for a bun making machine and more particularly to an attachment that may be added to a conventional bun forming machine as known in the art, so that the pieces of dough formed by the machine and delivered thereby to baking pans may be desirably shaped to create buns having improved and desirable characteristics.

A further object of the invention is the provision of a forming device for a bun making machine that may be quickly and easily attached to a bun forming machine so that the regular bun production may be altered quickly and easily to the shaped buns formed in accordance with the invention.

A still further object of the invention is the provision of a forming device for a bun making machine that incorporates a plurality of rotary forming units positioned on a common shaft in spaced relation and supported immediately above a conveyor in the bun forming machine. Each of the rotary forming units has a continuous annular dough engaging surface formed of a plurality of interconnecting raised thin ribs with spacing depressions in the rotary forming units therebetween. The size of the rotary forming units and the shaping and arrangement and spacing of the thin raised ribs on the peripheral surfaces thereof are such that the pieces of dough engaged thereby are substantially separated into a plurality of sections interconnected by thin connecting sections of dough so that at least four full sections are formed of each of the performed bun dough portions.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a portion of a conventional bun making machine showing the forming device positioned transversely of a final conveyor unit therein.

FIGURE 2 is an enlarged plan view of the forming device showing the individual rotary forming units on their carrying shaft.

By referring to the drawing, and FIGURE 1 in particular, it will be seen that a bun forming machine has been partially illustrated and comprises a machine as known in the art and used in various commercial bakeries for forming portions of dough into rounded flattened portions from which individual buns are baked. As disclosed in FIGURE 1, the portion of the bun making machine includes a first conveyor 10 which moves from left to right in the upper portion of the machine and brings the pieces of dough to a point adjacent an end 11. The formed pieces of dough are deposited on a horizontally disposed second conveyor 12 and moved to the left and as seen in FIGURE 1 on the secondary conveyor 12, from which they are deposited on a third conveyor 13 which moves them from left to right, as will be understood by those skilled in the art.

A flour distributor 14 is disposed above the innermost end of the third conveyor 13 in a position to apply suitable dusting flour to the third conveyor 13 as well as the portions of dough delivered thereto.

In FIGURE 1 of the drawing four portions of dough 15 are shown on the third conveyor 13 and moving horizontally from left to right. The portions of dough are removed from the third conveyor by a guide 16 and directed thereby into baking pans which move along beneath the third conveyor 13 from left to right and beneath the lower end (not shown) of the guide 16 so as to properly register with the portions of dough 15 being delivered therefrom, all as will be understood by those skilled in the art.

The present invention relates to a forming device positioned above the third conveyor 13 and transversely thereof by means of a pair of upstanding bifurcated brackets 17 which brackets include hand operated thumb screws 18 positioned so as to partially span the bifurcated portions of the brackets 17 and hold a shaft 19 in rotatable position relative thereto. The shaft 19 is provided with end bearings which directly engage the brackets 17 and the same may be seen in FIGURE 2 of the drawing and are indicated by the numerals 20. The shaft 19 carries a plurality of spaced rotary forming units 21, the peripheral surfaces of which comprise a plurality of interconnecting raised thin ribs 22, some of which run circumferentially of the rotary forming units 21 in a zig-zag pattern and others of which constituting extensions of same angle off from the zig-zag pattern to the edges of the rotary forming units. The various raised thin ribs 22 are separated from one another by a plurality of relatively deep depressions 23. The depressions 23 are rounded so that their walls curve upwardly into and join the raised ribs 22. The resulting shaping of the dough portions 15 as they pass beneath the rotary forming units 21 is such that the same resemble a group of pieces of dough in assembled relation with each of the pieces of dough of the group having a rounded appearance as imparted by the curved surfaces of the depressions 23 in the rotary forming units. The raised thin ribs 22 are spaced with respect to the third conveyor 13 sufficiently to avoid completely cutting through the portions 15 of the dough being shaped so that the shaped pieces of dough 15 will remain integral for handling as they move off of the third conveyor 13 over the guide 16 and into the baking pans. It will occur to those skilled in the art that the diameter of the rotary forming units 21 and the vertical spacing of the shaft 19 on which they are positioned relative to the upper face of the third conveyor 13 provides the proper spacing.

It will thus be seen that a forming device for a bun making machine has been disclosed which is simple, inexpensive in construction and easy to add to a conventional bun making machine so that the conventional round buns produced on the machine may be formed to produce an unusual bun having all the characteristics of the individually hand formed buns which are sometimes produced in the bakery art. Those skilled in the art will observe that the forming of the bun portions 15 by the rotary forming units 21 hereinbefore described, desirably conditions the buns before baking both as to appearance and texture, as it is well known that a bread product such as a bun that is formed of a plurality of small portions of dough has not only an attractive appearance when baked, but has an improved texture which contributes to its acceptability in the market.

It will thus be seen that a forming device for bun making machine has been disclosed which meets the several objects of the invention, and having thus described my invention, what I claim is:

1. A forming device for use with a bun making machine having a conveyor on which formed portions of dough travel, said forming device comprising a shaft positioned transversely of said conveyor, a plurality of rotary forming units on said shaft, each of said rotary forming units having a peripheral surface formed of a plurality of raised thin interconnecting ribs spacing a plurality of relatively deep depressions formed inwardly of the peripheral surface of said rotary forming units, said raised thin ribs being arranged in a circumferential pattern having a zig-zag shape with angularly disposed extensions running from said zig-zag shape to the edges of said rotary forming unit.

2. A forming device for use with a bun making machine having a conveyor on which formed portions of dough travel, said forming device comprising a shaft positioned transversely of said conveyor, a plurality of rotary forming units on said shaft, each of said rotary forming units having a peripheral surface formed of a plurality of raised thin interconnecting ribs spacing a plurality of relatively deep depressions formed inwardly of the peripheral surface of said rotary forming units, said depressions between the raised thin ribs on each of the rotary forming units being curved so that the deepest portions of the depressions are smaller than the areas between the raised thin ribs and the walls of the depressions being curved upwardly into and joining said raised thin ribs.

3. The combination of a bun making machine having a supported movable flat conveyor on which relatively flat portions of dough travel in side by side relation, and a dough forming device for use therewith, said forming device comprising a shaft positioned transversely of said conveyor, a plurality of rotary forming units rotatably positioned on said shaft to rotate in a given direction, each of said rotary forming units having a peripheral surface of a certain width formed of a plurality of raised thin interconnected ribs, some of said ribs extending circumferentially and medially of said surface and successively intersecting one another angularly and the other ribs extending inwardly from the edges of said peripheral surface and respectively intersecting the junctures of said first named ribs and points thereon offset from said junctures and separating a plurality of relatively deep depressions having rounded bottoms, said rotary forming units being positioned in closely spaced relation to said conveyor whereby said relatively flat portions of dough on said conveyor engage said rotary forming units so that the thin interconnected ribs thereof substantially separate the formed portions of dough into a plurality of grouped sections and increase the surface areas thereof.

4. The forming device for a bun making machine set forth in claim 3 and wherein the peripheral surfaces of the rotary forming units are spaced with respect to said conveyor on which the dough portions moves so that a thin interconnecting portion of dough remains to connect the formed sections of each of said dough portions.

References Cited

UNITED STATES PATENTS

| | | | |
|---|---|---|---|
| 1,708,758 | 4/1929 | Gottfried | 107—8 |
| 1,882,160 | 10/1932 | Paris | 107—69 |
| 2,919,664 | 1/1960 | Marasso | 107—9 |

WALTER A. SCHEEL, *Primary Examiner.*

JOSEPH SHEA, *Assistant Examiner.*

U.S. Cl. X.R.

107—8, 15, 68